(12) United States Patent
Watanabe et al.

(10) Patent No.: US 11,181,441 B2
(45) Date of Patent: Nov. 23, 2021

(54) SENSOR SYSTEM

(71) Applicant: Hitachi, Ltd., Tokyo (JP)

(72) Inventors: Keiji Watanabe, Tokyo (JP); Hiroaki Hasegawa, Tokyo (JP); Hisanori Matsumoto, Tokyo (JP); Daisuke Ryuzaki, Tokyo (JP)

(73) Assignee: Hitachi, Ltd., Tokyo (JP)

(*) Notice: Subject to any disclaimer, the term of this patent is extended or adjusted under 35 U.S.C. 154(b) by 361 days.

(21) Appl. No.: 16/193,003

(22) Filed: Nov. 16, 2018

(65) Prior Publication Data
US 2019/0310161 A1    Oct. 10, 2019

(30) Foreign Application Priority Data
Apr. 9, 2018 (JP) ............................. JP2018-074873

(51) Int. Cl.
| | |
|---|---|
| *G01M 13/00* | (2019.01) |
| *G01D 5/12* | (2006.01) |
| *G01H 1/00* | (2006.01) |
| *G01D 5/48* | (2006.01) |
| *G01D 5/34* | (2006.01) |

(52) U.S. Cl.
CPC ............ *G01M 13/00* (2013.01); *G01D 5/12* (2013.01); *G01D 5/34* (2013.01); *G01D 5/48* (2013.01); *G01H 1/003* (2013.01)

(58) Field of Classification Search
CPC .......... G01M 13/00; G01D 5/12; G01D 5/34; G01D 5/48; G01H 1/003
USPC .................................................. 73/593
See application file for complete search history.

(56) References Cited

U.S. PATENT DOCUMENTS

| | | | | |
|---|---|---|---|---|
| 4,188,816 | A | * 2/1980 | Mairson | F41G 7/00 73/1.38 |
| 2002/0077239 | A1 | * 6/2002 | Evans, III | B04B 9/146 494/7 |
| 2005/0216149 | A1 | * 9/2005 | Kato | G01P 21/00 73/1.37 |
| 2009/0177425 | A1 | * 7/2009 | Sugihara | G01P 21/00 702/85 |
| 2019/0360809 | A1 | * 11/2019 | Kabasawa | G01P 15/123 |

FOREIGN PATENT DOCUMENTS

JP        2010-61487 A    3/2010

* cited by examiner

*Primary Examiner* — Lisa M Caputo
*Assistant Examiner* — Rose M Miller
(74) *Attorney, Agent, or Firm* — Crowell & Moring LLP (57) ABSTRACT

A sensor system that detects a vibration of a rotating part with a high accuracy even in a case in which a sensor is additionally attached is provided. The invention is directed to a sensor system includes a board that is installed in a rotating part of a cut processing machine; a plurality of acceleration sensors mounted on the board, and a signal processing unit (arithmetic operation). The signal processing unit detects a translational acceleration accompanying moving of the rotating part and a centrifugal acceleration accompanying rotation of the rotating part on the basis of acceleration data detected by each of the acceleration sensors.

6 Claims, 11 Drawing Sheets

SENSOR SYSTEM

TECHNICAL FIELD

The present invention relates to a sensor system.

BACKGROUND ART

Since many processing devices operate in factories, state monitoring technologies for monitoring the states of the processing devices at the time of performing an operation have been improved.

For example, when a processing device thermally expands, a deviation in the amount of processing accompanying a thermal displacement occurs, and thus, there are cases in which the processing accuracy is degraded. In order to suppress the degradation of the processing accuracy due to such thermal expansion, it is effective to detect a change in the temperature of a processing device using a temperature sensor and executes a feedback of the influence of the detected change in temperature to a processing recipe in real time.

In addition, for example, in a processing device including a rotary part, there are cases in which a vibration occurs in the rotary part accompanying rotation.

Such a vibration is one factor degrading the processing accuracy. In order to suppress the degradation of a processing accuracy due to a vibration, it is effective to detect a vibration of a rotary part and executes a feedback of the influence of the detected vibration to a processing recipe in real time. In this way, in a processing device, various factors have influences on the processing accuracy.

For this reason, in recent years, processing devices including various sensors detecting information (a temperature, a vibration, and the like) having influences on processing accuracies are available as products, and the states of the processing devices are monitored using the sensors when the processing devices operate.

For example, as a processing device in which a sensor detecting a vibration of a rotary part is disposed, the following PTL 1 has been disclosed. In the processing device disclosed in PTL 1, a so-called rotary encoder is disposed, and a vibration of a rotary object is detected by the rotary encoder. More specifically, a sensor and a measurement circuit are mounted in a rotary object rotating at a high speed, and a detected distortion of the rotary object is detected as measurement data. The measurement data is transmitted to an external measurement device as digital data. At that time, data that has measured a phenomenon accompanying rotation of a broadband, of which a transmission band is equal to or higher than several 10 MHz, with high resolution at a high speed is transmitted to an external non-rotary measurement device using a transmission method not influenced by the high-speed rotation.

CITATION LIST

Patent Literature

PTL 1: JP-A-2010-61487

SUMMARY OF INVENTION

Technical Problem

In PTL 1, a shaft of a rotary encoder is connected to a rotation shaft, and a function for sensing a vibration is initially included. On the other hand, in order to monitor a vibration in a processing device in which a sensor is not disposed, it is necessary to additionally attach a sensor.

In order to accurately detect a vibration of a rotary part, it is preferable to install an acceleration sensor in the rotary part. However, in a case in which a sensor is installed as an additional attachment, it is difficult to acquire accurate data due to the influence of a centrifugal force. In addition, it is necessary to convert data detected in a rotary coordinate system into a stationary coordinate system. However, in a case in which a rotation direction of the rotary part cannot be accurately detected when data is acquired, an accurate acceleration data in the stationary coordinate system cannot be acquired.

Figure 11:
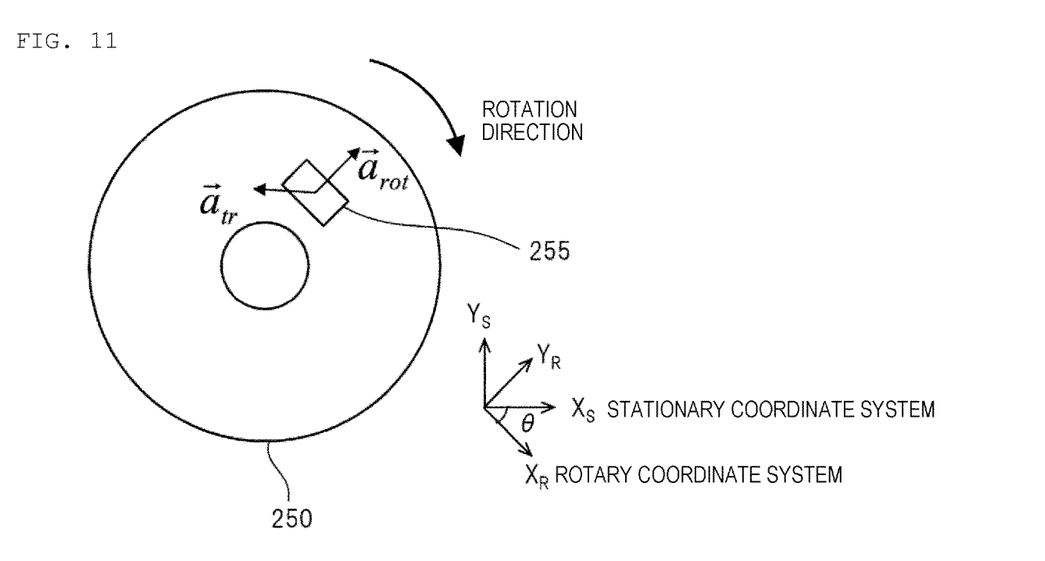
FIG. 11 is diagram illustrating the influence of a centrifugal force in a rotary coordinate system.

FIG. 11 is a diagram illustrating the influence of a centrifugal force in a rotary coordinate system. A board 250 in which an acceleration sensor 255 is mounted is connected to a rotation base part of a cut processing machine through a rotary holder. During an operation of the cut processing machine, the board 250 and the acceleration sensor 255 rotates together with the rotary holder. At this time, in acceleration data detected by the acceleration sensor, a translational acceleration $a_{tr}$ and a centrifugal acceleration $a_{rot}$ accompanying a vibration are included.

The acceleration data $(a(X_R), a(Y_R), a(Z_R))$ in a rotary coordinate system $(X_R, Y_R, Z_R)$ is converted into a translational acceleration $(a_{tr}(X_S), a_{tr}(Y_S), a_{tr}(Z_S))$ in a stationary coordinate system $(X_S, Y_S, Z_S)$ using the following numerical equations. Here, θ is an angle between the rotary coordinate system and the stationary coordinate system when data is detected, in other words, a rotation direction of the rotary part.

$$a_{tr}(X_S)=a(X_R)\cos\theta+[a(Y_R)-a_{rot}]\sin\theta \quad (1)$$

$$a_{tr}(Y_S)=-a(X_R)\sin\theta+[a(Y_R)-a_{rot}]\sin\theta \quad (2)$$

$$a_{tr}(Z_S)=a(Z_R) \quad (3)$$

As represented in numerical equations (1) and (2), a centrifugal acceleration $a_{rot}$ and an angle θ are included in translational accelerations $a_{tr}(X_S)$ and $a_{tr}(Y_S)$ converted into the stationary coordinate system. In this way, in a translational acceleration of a stationary coordinate system, a plurality of unknown numbers are present, and thus detection accuracies thereof have an influence on a detection accuracy of a translational acceleration in a stationary coordinate system.

An object of the present invention is to provide a sensor system capable of detecting a vibration of a rotary part with a high accuracy even in a case in which a sensor is additionally attached.

Solution to Problem

A representative overview of an invention among inventions disclosed in this application will be simply described as below.

A sensor system according to a representative embodiment of the present invention includes a board that is installed in a rotary part of a cut processing machine, a plurality of acceleration sensors mounted on the board, and an arithmetic operation unit. The arithmetic operation unit calculates a translational acceleration accompanying moving of the rotary part and a centrifugal acceleration accompanying rotation of the rotary part on the basis of acceleration data detected by each acceleration sensor.

Advantageous Effects of Invention

An effect acquired by a representative invention among inventions disclosed in this application will be simply described as below.

In other words, according to a representative embodiment of the present invention, a vibration of a rotary part can be detected with a high accuracy even in a case in which sensors are additionally attached.

DESCRIPTION OF EMBODIMENTS

Hereinafter, preferred embodiments of the present invention will be described in detail with reference to the drawings. In the drawings for describing the preferred embodiments of the present invention, the same reference sign will be assigned to members having the same function, and repetitive description thereof will be omitted.

Embodiment 1

In Embodiments 1 and 2, methods of detecting a centrifugal acceleration with a high accuracy will be described. First, in Embodiment 1, a case in which an acceleration sensor having detection axes of two axes is used will be described.

<Configuration of Cut Processing Machine>

Figure 1:
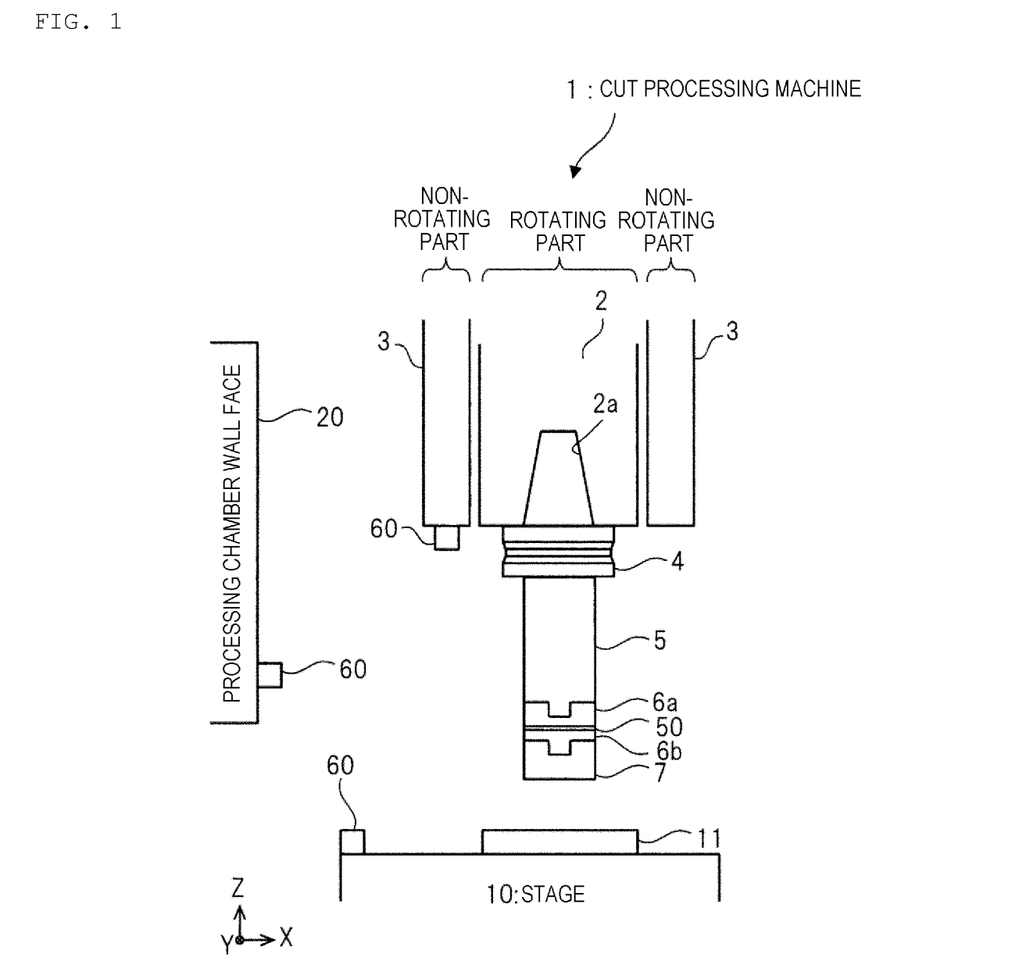
FIG. 1 is a side view of a cut processing machine in which a sensor system according to Embodiment 1 of the present invention is disposed.

FIG. 1 is a side view of a cut processing machine in which a sensor system according to Embodiment 1 of the present invention is disposed. FIG. 1 illustrates a view of a side face of the cut processing machine when seen on the −Y axis side.

A cut processing machine 1, as illustrated in FIG. 1, includes a rotation base part 2, a protection part 3, a joint part 4, a rotary holder (rotation main axis) 5, relay units 6a and 6b, a board 50, and a cutting tool 7. Below the cut processing machine 1, a stage 10 is installed. A work 11 that is a processing target is placed on the stage 10, and the cut processing machine 1 processes the work 11 using the cutting tool 7 that is rotating.

Hereinafter, the configuration of the cut processing machine 1 will be described. The rotation base part 2 is a member that rotates the rotary holder 5 and the cutting tool 7 in accordance with the rotation thereof. The rotation base part 2 has a cylindrical shape and extends in the vertical direction (Z axis direction). The rotation base part 2 is connected to a driving motor not illustrated in the drawing. The rotation base part 2 rotates around a center axis disposed in the vertical direction as its rotation axis in accordance with rotation of the driving motor.

As illustrated in FIG. 1, at a lower end of the rotation base part 2, a rotary holder mounting part 2a positioning the joint part 4 when the rotary holder 5 is mounted is formed. The rotary holder mounting part 2a has a tapered shape of which the width decreases from the lower end of the rotation base part 2 to the upper side.

The protection part 3 is a member that is disposed to cover the periphery of the rotation base part 2 and protects the rotation base part 2. In addition, various wirings and the like may be disposed inside the protection part 3. The protection part 3 is stopped even during the rotation of the rotation base part 2 and configures a non-rotating part.

The joint part 4 is a member that relays between the rotation base part 2 and the rotary holder 5. An upper portion of the joint part 4, as illustrated in FIG. 1, is formed in a tapered shape corresponding to the rotary holder mounting part 2a. The joint part 4 is positioned by having the upper portion inserted into the rotary holder mounting part 2a. Meanwhile, a lower part of the joint part 4, for example, has a cylindrical shape and supports the rotary holder 5. The lower part of the joint part 4 has a diameter larger than the upper part. Thus, the joint part 4 is mounted in a state in which an upper end of the lower portion is brought into contact with the lower end of the rotation base part 2 while the upper portion thereof is inserted into the rotary holder mounting part 2a.

The rotary holder 5 is a member that supports the board 50 and the cutting tool 7. The rotary holder 5, for example, has a cylindrical shape and extends in the vertical direction. A rotation axis of the rotary holder 5 coincides with the rotation base part 2 in the vertical direction, and the rotary holder 5 rotates around the rotation axis as its center.

As illustrated in FIG. 1, the relay unit 6a, the board 50, and the relay unit 6b are sequentially mounted to a lower end of the rotary holder 5. The relay unit 6a is a member that connects the board 50 to the rotary holder 5. The relay unit 6b is a member that connects the cutting tool 7 to the rotary holder 5 through the board 50.

Various sensors such as an acceleration sensor detecting a vibration of the rotary holder 5 or the cutting tool 7 and a temperature sensor are mounted in the board 50. The relay units 6a and 6b and the board 50, for example, have a disk shape. In addition, the diameters of the relay units 6a and 6b and the board 50 are almost the same as the diameter of the rotary holder. The board 50 in which the sensors and the like are mounted configures a part of the sensor system. Details of the board 50 will be described later.

The cutting tool 7 is a tool that cuts the work 11 while rotating in accordance with the transmission of rotation of the rotation base part 2 through the rotary holder 5. The cutting tool 7 is a cutting blade including a plurality of blades or the like.

The rotation base part 2, the rotary holder 5, the board 50, the cutting tool 7, and the like, which rotate at an operation time, configure a rotation part.

<Configuration of Sensor System>

Figure 2:
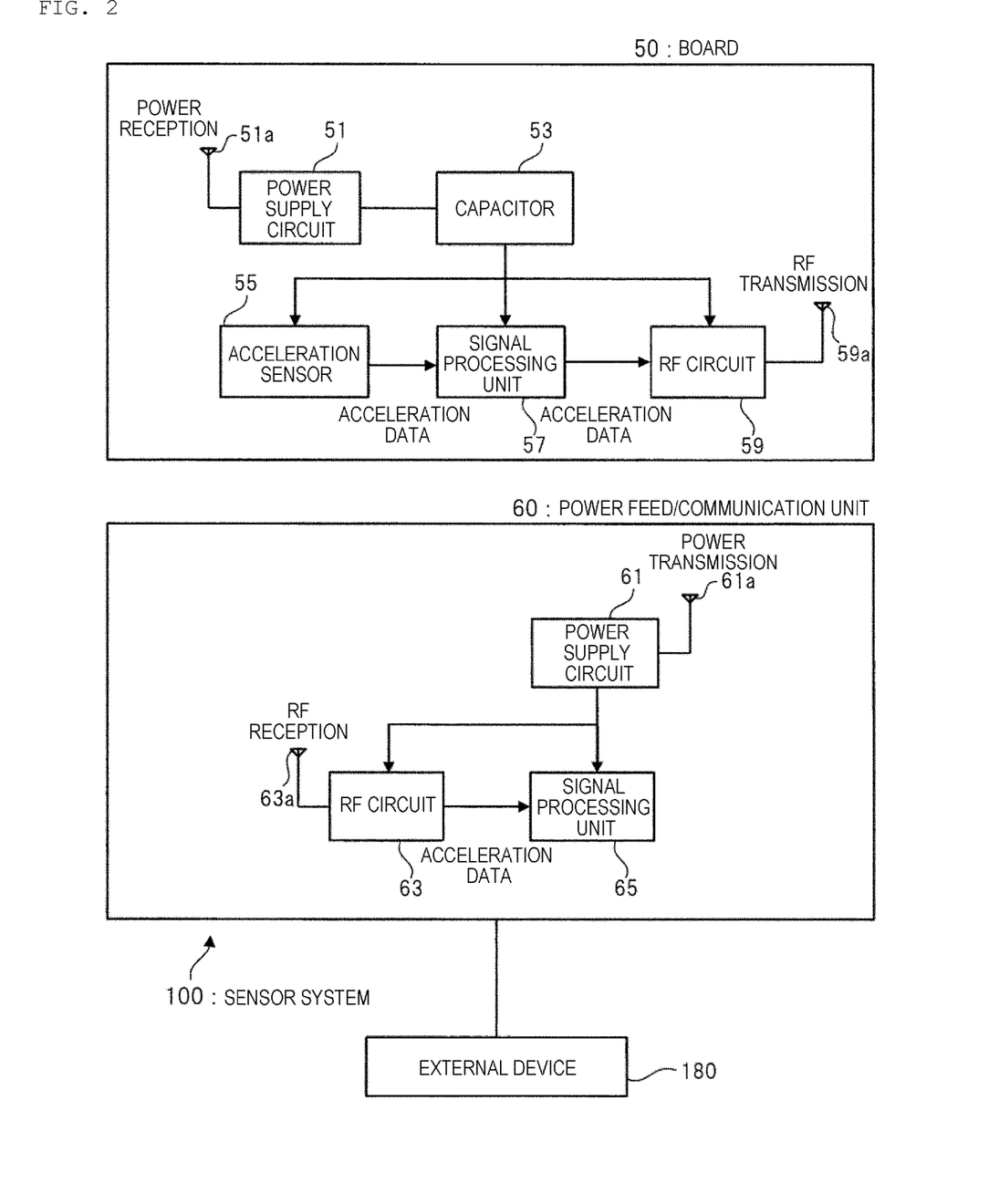
FIG. 2 is a block diagram illustrating one example of the configuration of the sensor system according to Embodiment 1 of the present invention.
Figure 3:
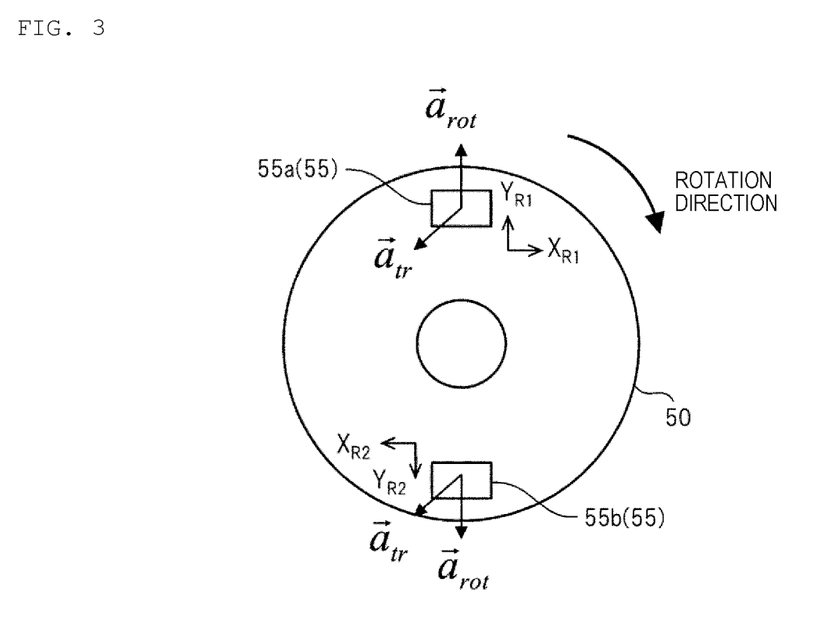
FIG. 3 is a diagram illustrating one example of arrangement of sensors in a board according to Embodiment 1 of the present invention.

Next, the configuration of the sensor system will be described. FIG. 2 is a block diagram illustrating one example of the configuration of a sensor system according to Embodiment 1 of the present invention. FIG. 3 is a diagram illustrating one example of arrangement of sensors in a board according to Embodiment 1 of the present invention. In FIG. 3, although acceleration sensors 55 (55a and 55b) are displayed on the board 50, actually, other sensors and various circuit blocks to be described later are mounted.

A sensor system 100, as illustrated in FIG. 2, includes a board 50 and a power feed/communication unit 60.

The board 50 includes a power supply circuit 51, a power reception antenna 51a, a capacitor 53, an acceleration sensor 55, a signal processing unit 57, an RF circuit 59, and an RF transmission antenna 59a.

The board 50 is mounted in the rotary holder 5 as additional attachment, and it is difficult to feed power to the board 50 using wires. Thus, in this embodiment, electric power is supplied wirelessly from the power feed/communication unit 60 to the board 50.

The power reception antenna 51a receives electric power transmitted from the power feed/communication unit 60 and supplies the received electric power to the power supply circuit 51. The power supply circuit 51 supplies the received electric power to the capacitor 53, thereby charging the capacitor 53.

The capacitor 53 supplies the electric power supplied from the power supply circuit 51 to the acceleration sensor 55, the signal processing unit 57, and the RF circuit 59. In addition, the electric power supplied to the acceleration sensor 55, the signal processing unit 57, and the RF circuit 59 may be either AC power or DC power. The acceleration sensor 55, the signal processing unit 57, and the RF circuit 59 may execute power conversion to DC or AC or modulation of a voltage or a frequency as is necessary. In addition, the power supply circuit 51 may execute power conversion from DC or AC or modulation of a voltage or a frequency.

The acceleration sensor 55 is a sensor that detects acceleration and outputs the detected acceleration as acceleration data. A plurality of acceleration sensors 55 are mounted on the board 50. For example, although an example in which two acceleration sensors 55a and 55b are mounted on the board 50 is illustrated in FIG. 3, three acceleration sensors or more may be mounted. In addition, other than such components, various sensors such as a temperature sensor and the like detecting the states of the cut processing machine 1, which are not illustrated in the drawing, are mounted in the board 50.

The acceleration sensors 55a and 55b, for example, are symmetrically arranged with a rotation axis interposed therebetween. In other words, the acceleration sensors 55a and 55b are arranged at positions of which a mutual rotation direction is 180°. In addition, the acceleration sensors 55a and 55b are arranged at positions having the same distance from the rotation axis. By employing such an arrangement, centrifugal accelerations $a_{rot}$ are in opposite directions in the acceleration sensors 55a and 55b, and a process of detecting a translational acceleration $a_{tr}$ is decreased, and the processing time is shortened. The arrangement of the acceleration sensors is not limited to such a case, and a plurality of acceleration sensors may be arranged at arbitrary positions on the board 50.

In this embodiment, the acceleration sensors 55a and 55b include a plurality of detection axes (for example, two axes). For example, the acceleration sensor 55a detects accelerations $a(X_{R1})$ and $a(Y_{R1})$ in directions of an axis $X_{R1}$ and an axis $Y_{R1}$ illustrated in FIG. 3. Similarly, the acceleration sensor 55b detects accelerations $a(X_{R2})$ and $a(Y_{R2})$ in directions of an axis $X_R$ and an axis $Y_R$ illustrated in FIG. 3 as acceleration data. Each of the acceleration sensors 55a and 55b supplies detected acceleration data to the signal processing unit 57.

The signal processing unit 57 is a circuit block that performs a pre-process of detection data (acceleration data, temperature data, and the like) supplied from the acceleration sensors 55 and the other sensors. The signal processing unit 57, for example, is a memory control unit (MCU), a central processing unit (CPU), or the like. The signal processing unit 57, for example, performs a process of thinning detection data and supplies detection data after the thinning process to the RF circuit 59. Accordingly, the amount of detection data is decreased, and the processing time is shortened. In addition, the signal processing unit 57 may perform a process of compressing the detection data after the thinning process.

The RF circuit 59 transmits detection data supplied from the signal processing unit 57 through the RF transmission antenna 59a.

The power feed/communication unit 60 is a unit that performs power feed to the board 50 and receives detection data (acceleration data and the like) detected by the sensors from the board 50. The power feed/communication units 60, as illustrated in FIG. 1, for example, are installed at non-rotating parts such as a lower end of the protection part 3, the stage 10, the processing chamber wall face 20, and the like.

The power feed/communication unit 60, as illustrated in FIG. 2, includes a power supply circuit 61, a power transmission antenna 61a, an RF circuit 63, an RF reception antenna 63a, and a signal processing unit (an arithmetic operation unit and an angle detecting unit) 65.

The power supply circuit 61 transmits electric power toward the board 50 through the power transmission antenna 61a. The power supply circuit 61 is connected to a power supply not illustrated in the drawing and transmits electric power supplied from the power supply.

The RF circuit 63 receives detection data transmitted from the signal processing unit 57 of the board 50 through the RF reception antenna 63a. The RF circuit 63 supplies the received detection data to the signal processing unit 65.

The signal processing unit 65 is a circuit block that performs signal processing for the received detection data. The signal processing unit 65, for example, performs various processes such as a fast Fourier transform process (FFT process) and a filter process for the detection data. In addition, the signal processing unit 65 detects acceleration data ($a(X_{R1})$, $a(Y_{R1})$, $a(Z_{R1})$) and ($a(X_{R2})$, $a(Y_{R2})$, $a(Z_{R2})$) of the detection axes detected by each of the acceleration sensors 55a and 55b on the basis of the detection data after the signal processing.

The signal processing unit 65 detects a translational acceleration $a_{tr}$ and a centrifugal acceleration $a_{rot}$ accompanying the rotation in a rotary coordinate system on the basis of the acceleration data detected by each of the acceleration sensors 55 (55a and 55b). Here, since the acceleration sensors 55a and 55b are symmetrically arranged on the board 50 with the rotation axis interposed therebetween, the directions of centrifugal accelerations that the acceleration sensors 55a and 55b receive are opposite directions. Meanwhile, the directions of the translational accelerations in the acceleration sensors 55a and 55b are the same. On the basis of such a relation, the translational accelerations $a_{tr}(X_{R1})$ and $a_{tr}(Y_{R1})$ and the centrifugal accelerations $a_{rot}(X_{R1})$, $a_{rot}(Y_{R1})$ in the rotary coordinate system are represented using the following numerical equations.

$$a_{tr}(X_{R1})=[a(X_{R1})-a(X_{R2})]/2 \quad (4)$$

$$a_{tr}(Y_{R1})=[a(Y_{R1})-a(Y_{R2})]/2 \quad (5)$$

$$a_{rot}(X_{R1})=[a(X_{R1})+a(X_{R2})]/2(=0) \quad (6)$$

$$a_{rot}(Y_{R1})=[a(Y_{R1})+a(Y_{R2})]/2 \quad (7)$$

The signal processing unit 65 detects translational accelerations ($a_{tr}(X_S)$, $a_{tr}(Y_S)$) in the stationary coordinate system on the basis of relations represented in such numerical equations (4) to (7) and relations of equations (1) and (2). The signal processing unit 65 acquires data of an angle θ between the rotary coordinate system and the stationary coordinate system that is separately detected and detects translational accelerations in the stationary coordinate system on the basis of the acquired angle θ.

In addition, the acceleration sensor 55 having a detection axis in the direction of the rotation axis (Z-axis direction) may be mounted on the board 50. Accordingly, a translational acceleration can be detected with a higher accuracy.

In addition, as illustrated in FIG. 2, the power feed/communication unit 60 is connected to an external device 180 such as a PC. The external device 180 displays designation of a detection (measurement) condition of acceleration data, detection data of various sensors such as acceleration data, and the state of the cut processing machine 1 detected by another sensor on a display unit using software. In addition, the external device 180 may perform a coordinate conversion process for the acceleration data. Accordingly, the load of the signal processing unit 65 is decreased, and the power consumption of the power feed/communication unit 60 is decreased.

<Main Effect According to this Embodiment>

According to this embodiment, the detection accuracy of a centrifugal acceleration in the rotary coordinate system can be improved, and accordingly, even when a sensor is additionally attached, a vibration of the rotating part can be detected with a high accuracy.

In addition, according to this embodiment, the mutual acceleration sensors 55 are symmetrically arranged with the rotation axis of the rotating part interposed therebetween. According to such a configuration, the centrifugal accelerations that the acceleration sensors 55a and 55b receive are in opposite directions, and accordingly, the centrifugal accelerations can be simply handled, and the detection accuracy of a translational acceleration in the rotary coordinate system is improved.

In addition, according to this embodiment, the acceleration sensors 55a and 55b are arranged at the same distance from the rotation axis. According to such a configuration, the centrifugal accelerations that the acceleration sensors 55a and 55b receive have the same magnitudes and opposite directions, and accordingly, the centrifugal accelerations can be handled more simply, and the detection accuracy of a translational acceleration in the rotary coordinate system is improved.

Embodiment 2

Next, Embodiment 2 will be described. In Embodiment 2, a case in which an acceleration sensor having a detection axis of one axis is used will be described. Hereinafter, basically, description of a part common to the embodiment described above will be omitted.

Figure 4:
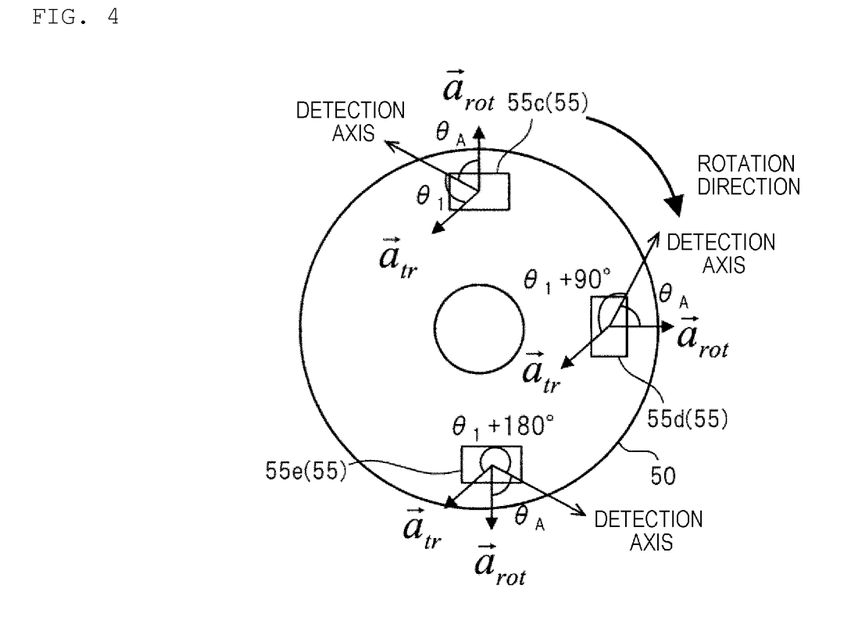
FIG. 4 is a diagram illustrating one example of arrangement of sensors according to Embodiment 2 of the present invention.

FIG. 4 is a diagram illustrating one example of arrangement of sensors according to Embodiment 2 of the present invention. As illustrated in FIG. 4, three acceleration sensors 55c, 55d, and 55e are mounted on a board 50. Each of the acceleration sensors 55c, 55d, and 55e has a detection axis of one axis and is arranged such that the detection axis has an angle $θ_A$ with respect to a centrifugal acceleration $a_{rot}$. In addition, a distance between each of the acceleration sensors 55c, 55d, and 55e and the rotation axis is assumed to be known.

The acceleration sensors 55c, 55d, and 55e are sequentially arranged on the board 50 from the upstream side in a rotation direction. The acceleration sensor 55c is arranged in an upper portion of the board 50 in FIG. 4. The acceleration sensor 55d is arranged in a right portion of the board 50 in a direction rotated by 90 degrees with respect to the acceleration sensor 55c in FIG. 4. The acceleration sensor 55e is arranged in a lower portion of the board 50 in a direction rotated by 180° with respect to the acceleration sensor 55c in FIG. 4. In other words, the acceleration sensors 55c and 55e are symmetrically arranged with the rotation axis of the rotating part interposed therebetween. Also in this embodiment, the arrangement of the acceleration sensors is not limited thereto.

An angle between the detection axis of the acceleration sensor 55c and a translational acceleration at, is $θ_1$. An angle between the detection axis of the acceleration sensor 55d and the translational acceleration at, is $θ_1+900$. An angle between the detection axis of the acceleration sensor 55d and the translational acceleration at, is $θ_1+180°$. In this way, in this embodiment, since there are three unknown numbers (the centrifugal acceleration, the angle θ1, and the angle θ), at least three acceleration sensors are mounted on the board 50.

According to this embodiment, in addition to the effects according to the embodiment described above, the following effects can be acquired. According to this embodiment, an acceleration sensor having a detection axis of one axis is used. According to such a configuration, each acceleration sensor 55 can be configured to have a small size and a light weight.

Embodiment 3

Hereinafter, in Embodiments 3 to 7, methods for detecting an angle θ between a rotary coordinate system and a stationary coordinate system with a high accuracy will be described. First, in Embodiment 3, a method of detecting angle data (angle θ) using a magnetic sensor will be described.

FIG. 5 is a diagram illustrating one example of the configuration of an angle detecting unit according to Embodiment 3 of the present invention. FIG. 5(a) is a diagram illustrating arrangement of a magnet. FIGS. 5(b) and 5(c) are diagrams illustrating arrangement of a magnetic sensor and an example of arrangement between a magnet and a magnetic sensor in the plan view. FIG. 5(b) corresponds to a case in which the magnetic field is the strongest and illustrates a case in which a magnet 70 and a magnetic sensor 71 are closest to each other. FIG. 5(c) corresponds to a case in which the magnetic field is the weakest and illustrates a case in which the magnet 70 and the magnetic sensor 71 are the farthest from each other. FIG. 5(d) is a diagram illustrating a change in the magnetic field, which the rotating magnetic sensor 71 receives, with respect to time.

Figure 5A:
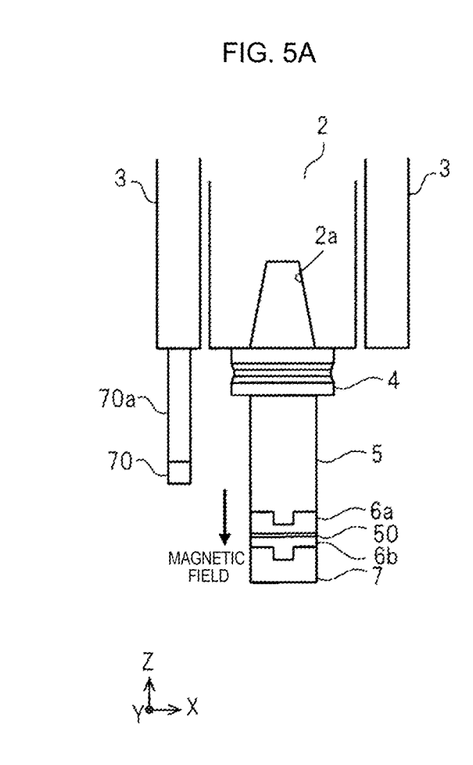
FIGS. 5A to 5D are diagrams illustrating one example of the configuration of an angle detecting unit according to Embodiment 3 of the present invention.
Figure 5B:
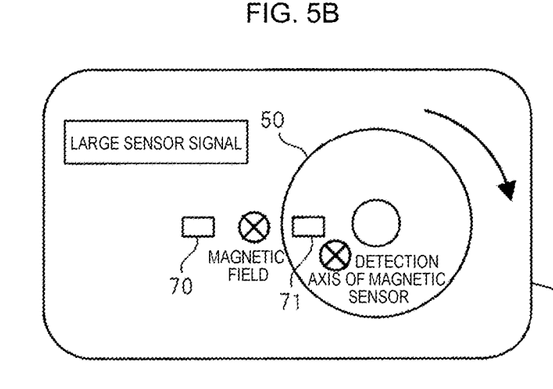
Figure 5C:
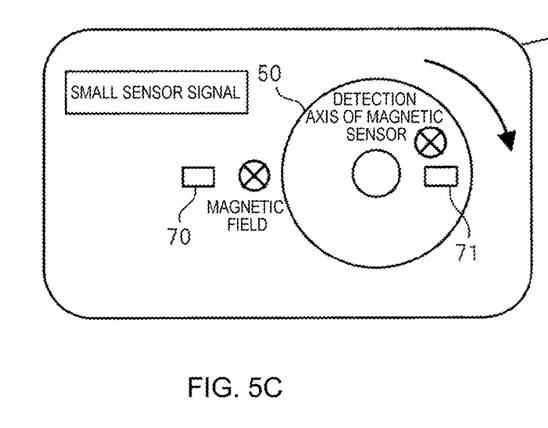
Figure 5D:
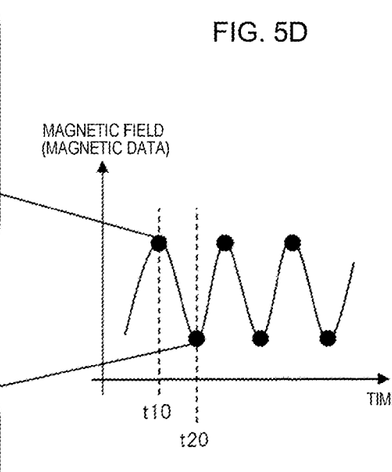

An angle detecting unit includes the magnet 70 illustrated in FIG. 5(a) and the magnetic sensor illustrated in FIGS. 5(b) and 5(c).

The magnet 70, as illustrated in FIG. 5(a), is installed below a protection part 3. More specifically, a magnet supporting part 70a extending in the vertical direction (Z-axis direction) is connected to a lower end of the protection part 3, and the magnet 70 is supported by the lower end of the magnet supporting part 70a. Accordingly, the magnet 70 is installed in a non-rotating part. As illustrated in FIG. 5, the direction of a magnetic field near the board 50 is directed from the upper side (Z axis) to the lower side (−Z side) for the magnetic sensor 71. However, the position of the magnet 70 is not limited to such a case.

In addition, a length of the magnet supporting part 70a is set with an arrangement relation with the magnet 70 taken into account. For example, the length of the magnet supporting part 70a may be set such that the magnet 70 is arranged next to the board 50. In addition, the length of the magnet supporting part 70a may be set, as illustrated in FIG. 5(a), such that the magnet 70 is arranged on an upper side of the magnetic sensor 71 with the arrangement relation of the stage 10 and the work 11 and the like taken into account.

The magnetic sensor 71, as illustrated in FIGS. 5(b) and 5(c), is mounted on the board 50. As the magnetic sensor 71, for example, a sensor having a detection axis of one axis is used. The detection axis of the magnetic sensor 71 is directed from the upper side (Z side) to the lower side (−Z side). The magnetic sensor 71 detects magnetic data on the basis of a magnetic field generated from the magnet 70.

For example, as illustrated in FIG. 5(b), in a case in which the magnet 70 and the magnetic sensor 71 are the closest to each other, a magnetic field that the magnetic sensor 71 receives is the strongest. This corresponds to a magnetic field at a time t10 illustrated in FIG. 5(d), and the magnetic sensor 71 detects magnetic data having the largest value. On the other hand, as illustrated in FIG. 5(c), in a case in which the magnet 70 and the magnetic sensor 71 are the farthest from each other, a magnetic field that the magnetic sensor 71 receives is the weakest. This corresponds to a magnetic field at a time t20 illustrated in FIG. 5(d), and the magnetic sensor 71 detects magnetic data having the smallest value.

The angle detecting unit detects a rotation direction of the rotating part as angle data on the basis of the magnetic data. For example, the signal processing unit 65 converts acceleration data detected by the acceleration sensor into data from a rotary coordinate system to a stationary coordinate system on the basis of the arrangement of the acceleration sensor 55 and the angle detecting unit and the angle data. The arrangement relations between the acceleration sensors 55 (for example, 55a to 55e) mounted on the board 50 and the magnetic sensor 71 are known.

Thus, the signal processing unit 65 detects an angle (angle data) of the magnetic sensor from the magnetic data and detects an angle (angle data) θ between a rotary coordinate system and a stationary coordinate system in the acceleration sensor 55 from the arrangement relation between the detected angle data and the sensor.

Then, the signal processing unit 65 converts the acceleration data of the rotary coordinate system into acceleration data of the stationary coordinate system on the basis of the detected angle θ. In this way, the signal processing unit 65 detects translational accelerations ($a_{tr}(X_S)$, $a_{tr}(Y_S)$, $a_{tr}(Z_S)$). Accordingly, the signal processing unit 65 also functions as an angle detecting unit.

<Main Effects According to this Embodiment>

According to this embodiment, the rotation direction of the rotating part can be detected with a high accuracy, and accordingly, error in the acceleration data at the time of coordinate system conversion is decreased. Accordingly, even in a case in which a sensor is additionally attached, the vibration of the rotating part can be detected with a high accuracy.

Embodiment 4

Next, Embodiment 4 will be described. Also in Embodiment 4, a method of detecting angle data (angle θ) using a magnetic sensor will be described.

FIG. 6 is a diagram illustrating one example of the configuration of an angle detecting unit according to Embodiment 4 of the present invention. FIG. 6(a) is a diagram illustrating arrangement of a magnet. FIGS. 6(b) and 6(c) are diagrams illustrating arrangement of a magnetic sensor and an example of arrangement between a magnet and a magnetic sensor in the plan view. FIG. 6(d) is a diagram illustrating a change in a magnetic field that the rotating magnetic sensor 71 receives with respect to time.

Figure 6A:
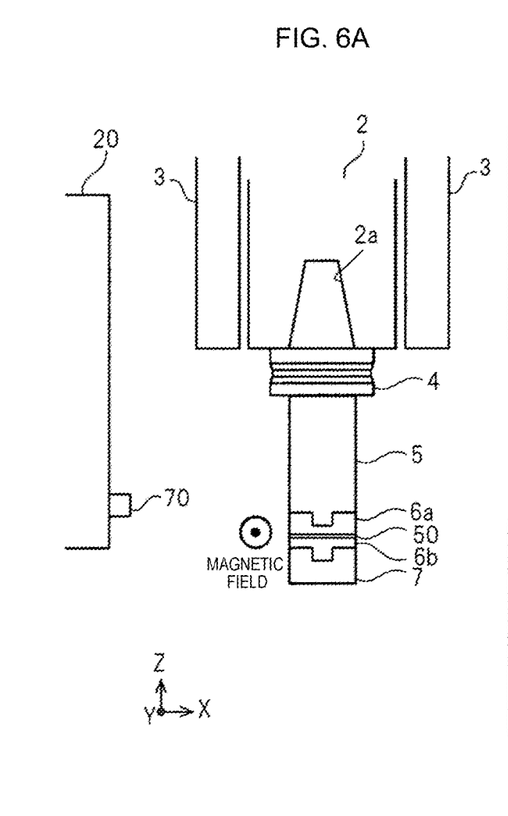
FIGS. 6A to 6D are diagrams illustrating one example of the configuration of an angle detecting unit according to Embodiment 4 of the present invention.

The magnet 70, for example, as illustrated in FIG. 6(a), is installed on a processing chamber wall face 20. As illustrated in FIG. 6, the direction of a magnetic field near a board 50 is a direction from the +Y axis to the −Y axis. A detection axis of the magnetic sensor 71, for example, is in a direction orthogonal to a centrifugal acceleration and a direction opposite to a rotation direction inside an XY plane.

Figure 6B:
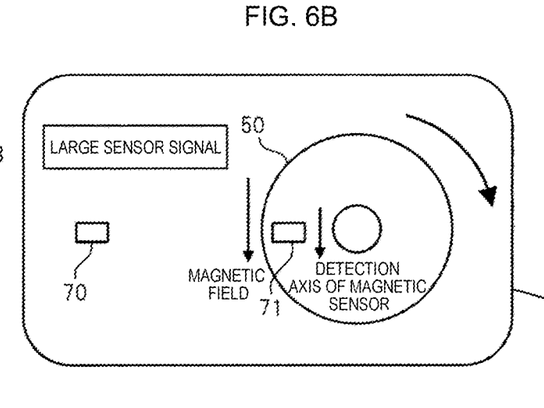
Figure 6C:
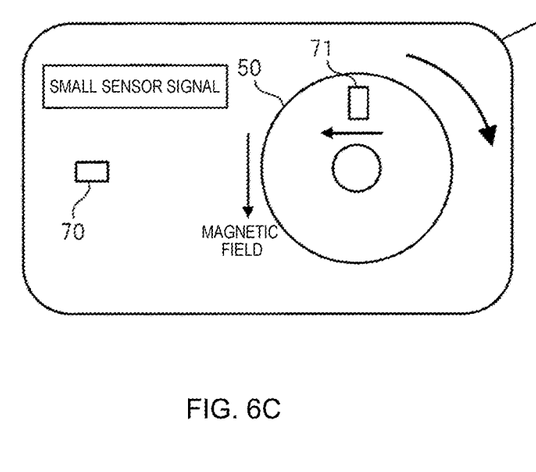
Figure 6D:
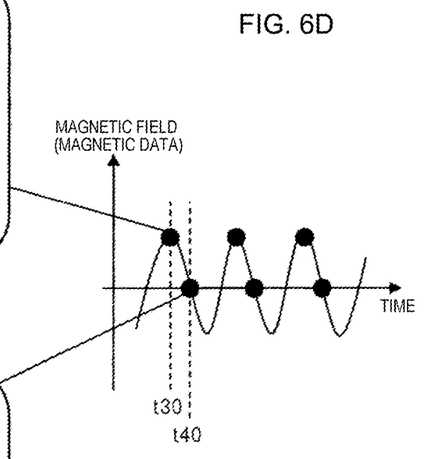

FIG. 6(b) corresponds to a case in which the magnetic field is the strongest and illustrates a case in which the magnet 70 and the magnetic sensor 71 are closest to each other. At this time, detected magnetic data, for example, corresponds to a time t30 illustrated in FIG. 6(d). On the other hand, in FIG. 6(c), the magnetic sensor 71 is arranged at the highest position in the +Y-axis direction. In such a case, the magnetic sensor 71 moves in a direction orthogonal to the magnetic field and thus hardly detects the magnetic field. At this time, the detected magnetic data, for example, corresponds to a time t40 illustrated in FIG. 6(d) and is almost zero.

The signal processing unit 65, similar to Embodiment 3, detects an angle (angle data) of a magnetic sensor from magnetic data and detects an angle (angle data) θ between the rotary coordinate system and the stationary coordinate system in the acceleration sensor 55 on the basis of the arrangement relation between the detected angle data and the sensor.

Also according to this embodiment, effects similar to those of Embodiment 3 are acquired.

Embodiment 5

Next, Embodiment 5 will be described. In Embodiment 5, a method of detecting angle data (angle θ) using a phase of a current driving a rotating part will be described. Generally, a motor current of a rotating part has a sinusoidal wave, and the period thereof coincides with a rotation period of the rotating part. However, in order to use this method, an initial phase (rotation direction) of the rotating part needs to be detected.

FIG. 7 is a diagram illustrating one example of the configuration of an angle detecting unit according to Embodiment 5 of the present invention. FIG. 7(a) is a diagram illustrating an operation of a board 50 before a moving operation. FIG. 7(b) is a diagram illustrating an operation of the board 50 when the rotation operation is performed. FIG. 7(c) is a diagram illustrating a rotation direction of the board 50 that is a rotating part. FIG. 7(d) is a diagram illustrating an example of a current flowing through a driving motor of the rotating part.

Figure 7A:
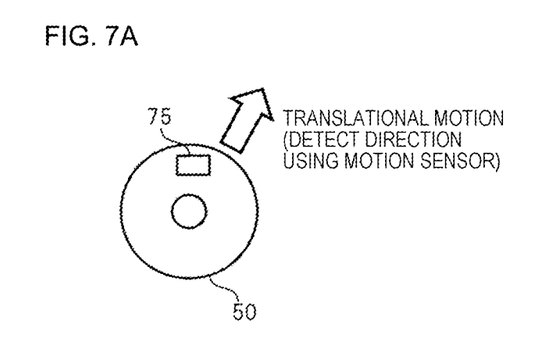
FIGS. 7A to 7D are diagrams illustrating one example of the configuration of an angle detecting unit according to Embodiment 5 of the present invention.
Figure 7B:
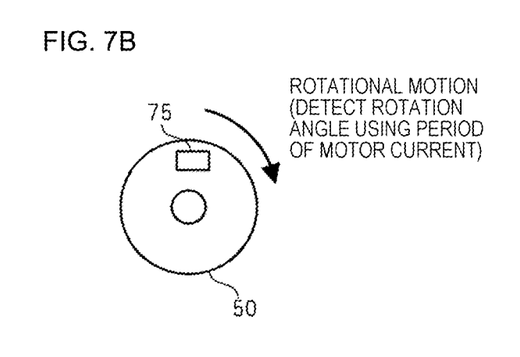

An angle detecting unit includes a motion sensor 75 illustrated in FIGS. 7(a) and 7(b) and an ammeter not illustrated in the drawing. The motion sensor 75 is mounted on the board 50 and is a sensor that detects an initial phase of a rotation direction of the board 50 before rotation. For example, a sensor having detection axes of two axes is used as the motion sensor 75.

For example, when a typical operation before processing performed when the cutting tool 7 such as a blade is replaced, the motion sensor 75 detects a translational operation of the board 50 as motion data. The ammeter, as illustrated in FIG. 7(d), detects a phase of a current flowing through the driving motor of the rotating part.

Figure 7C:
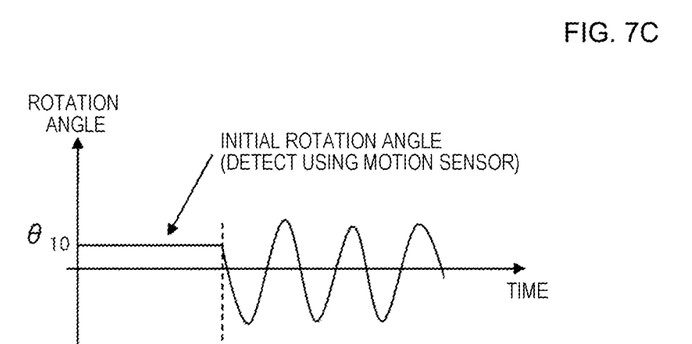
Figure 7D:
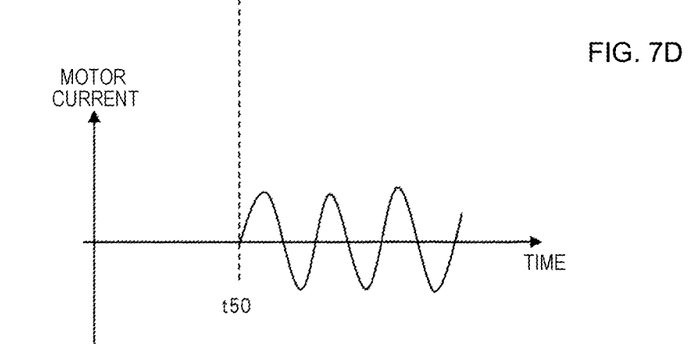

The signal processing unit 65 detects an initial phase $\theta_{10}$ of the board 50 illustrated in FIG. 7(c) on the basis of detected motion data. Then, when the rotating part rotates at a time t50 (FIG. 7(b)), the signal processing unit 65 detects a phase of the current on the basis of current data measured by the ammeter. Then, the signal processing unit 65 detects a rotation direction of the rotating part during rotation, in other words, an angle $\theta$ between the rotary coordinate system and the stationary coordinate system on the basis of the initial phase and the phase of the current as angle data.

According to this embodiment, the rotation direction of the board 50 that is the rotating part can be detected on the basis of phase information of the motor current. In addition, according to this embodiment, while the rotating part is driven, motion data does not need to be received.

Embodiment 6

Next, Embodiment 6 will be described. In this embodiment, a method of detecting angle data (angle $\theta$) on the basis of an intensity of angle detection light will be described.

Figure 8A:
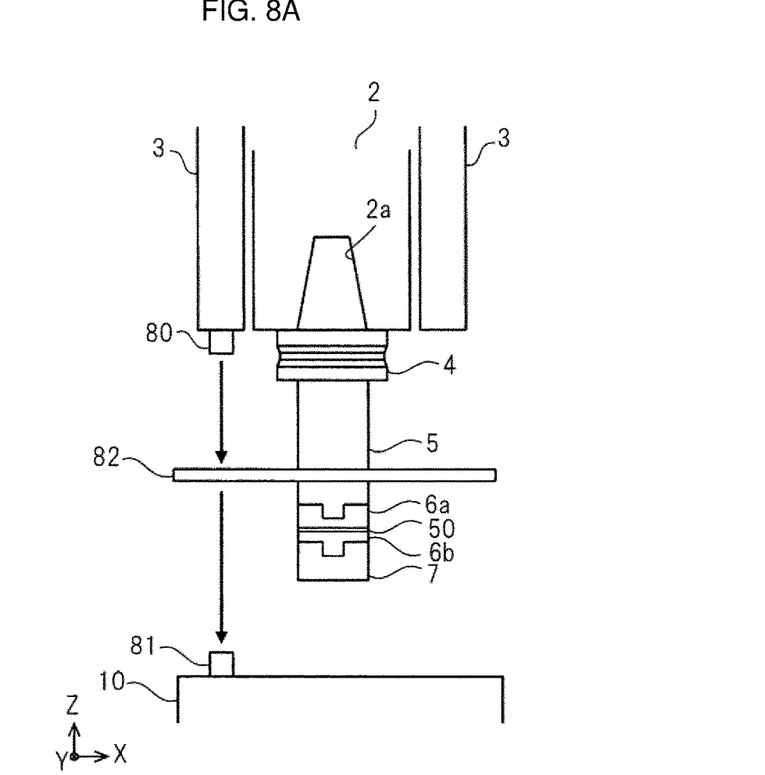
FIGS. 8A and 8B are diagrams illustrating one example of the configuration of an angle detecting unit according to Embodiment 6 of the present invention.
Figure 8B:
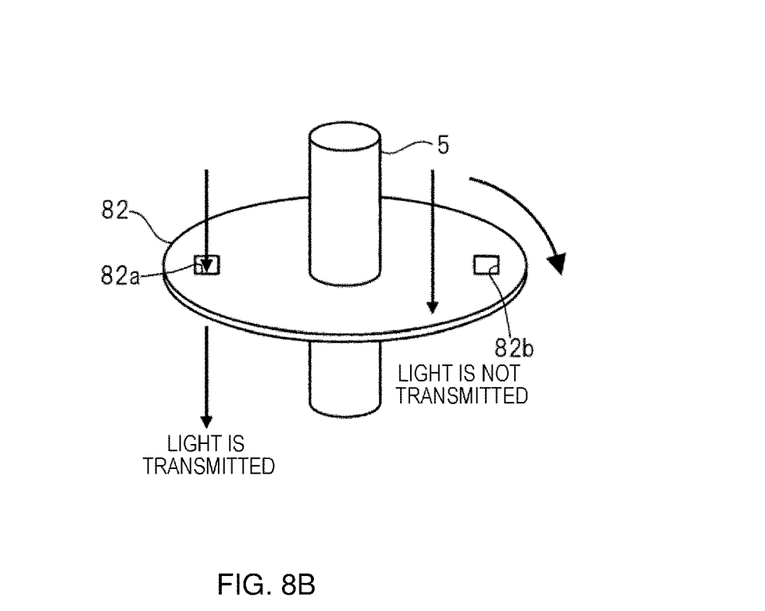

FIG. 8 is a diagram illustrating one example of the configuration of an angle detecting unit according to Embodiment 6 of the present invention. FIG. 8(a) is a side view of a cut processing machine 1 in which an angle detecting unit is installed. FIG. 8(b) is a perspective view illustrating details of the configuration of a slit plate.

The angle detecting unit according to this embodiment includes a light emitting unit 80, a light receiving unit 81, and a slit plate 82. The light emitting unit 80, for example, is installed at a lower end of a protection part 3 that is a non-rotating part. The light emitting unit 80 emits angle detection light toward the light receiving unit 81 disposed on the lower side (−Z direction). As a light source of the light emitting unit 80, for example, an LED, a semiconductor laser, or the like is used.

The light receiving unit 81, for example, is installed on a stage 10 disposed below the slit plate 82. In other words, the light emitting unit 80 and the light receiving unit 81 are arranged at positions facing each other with the slit plate 82 interposed therebetween. The light receiving unit 81, for example, is a photodiode. The light receiving unit 81 receives angle detection light emitted from the light emitting unit 80 and detects light intensity data on the basis of an intensity of the angle detection light when the light is received.

The slit plate 82, as illustrated in FIG. 8, is installed in a rotary holder 5. The slit plate 82, as illustrated in FIG. 8(b), includes a plurality of slit parts 82a and 82b. Each of the slit parts 82a and 82b is formed at a position passing between the light emitting unit 80 and the light receiving unit 81 when the slit plate 82 rotates. In addition, there may be one slit part.

The slit plate 82 rotates together with the rotary holder 5 that is a rotating part. In addition, the slit parts 82a and 82b also rotate together with the rotation of the slit plate 82. When the slit parts 82a and 82b are in a predetermined rotation direction, the light emitting unit 80, the slit part 82a (82b), and the light receiving unit 81 are arranged in one straight line. At this time, the angle detection light output from the light emitting unit 80 is received by the light receiving unit 81 through the slit part 82a (82b), and the light receiving unit 81 detects light intensity data.

The signal processing unit 65 detects angle data on the basis of the light intensity data and detects an angle (angle data) $\theta$ between the rotary coordinate system and the stationary coordinate system on the basis of the detected angle data. In this way, according to this embodiment, by tracing a change in the light intensity, which is detected by the light receiving unit, with respect to time, a rotation direction can be detected.

According to this embodiment, angle data can be detected without disposing a sensor in the board 50.

Embodiment 7

Next, Embodiment 7 will be described. In this embodiment, a method of detecting angle data (angle $\theta$) on the basis of a time until a reflective wave of an ultrasonic wave arrives will be described.

Figure 9A:
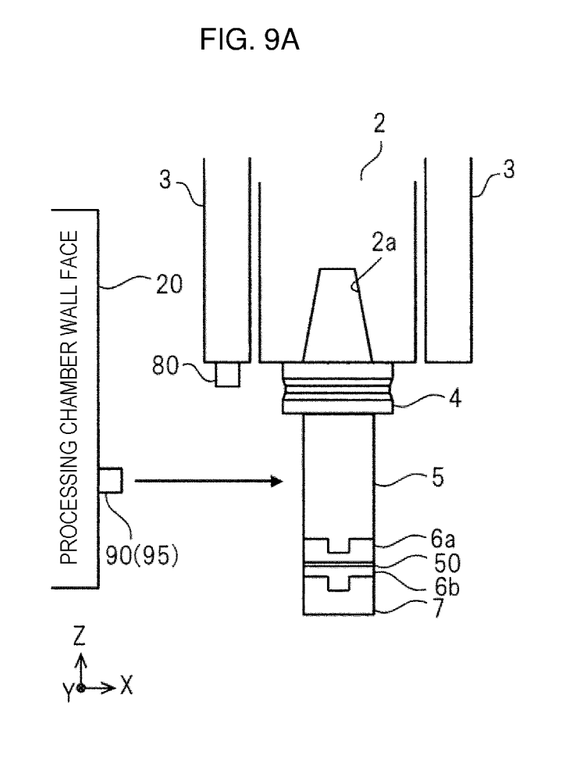
FIGS. 9A and 9B are diagrams illustrating one example of the configuration of angle detecting units according to Embodiments 7 and 8 of the present invention.
Figure 9B:
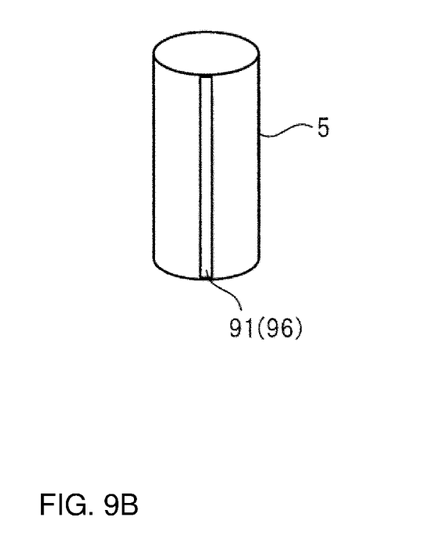

FIG. 9 is a diagram illustrating one example of the configuration of angle detecting units according to Embodiments 7 and 8 of the present invention. FIG. 9(a) is a side cross-sectional view of a cut processing machine in which an angle detecting unit is installed. FIG. 9(b) is a diagram illustrating an example a level difference formed on a rotation side face of a rotary holder 5.

The angle detecting unit according to this embodiment includes a level difference 91 formed on a rotation side face of the rotary holder 5 that is a rotating part and an ultrasonic wave transmitting/receiving terminal 90 disposed in a non-rotating part.

As the level difference 91, for example, as illustrated in FIG. 9(b), a level difference 91 that is long in the vertical direction (Z direction) is formed on a rotation side face of the rotary holder 5. The level difference 91 may be a groove or a projection. In addition, level differences 91 may be formed at a plurality of positions as long as there is a difference in the depths of grooves or the heights of projections.

The ultrasonic wave transmitting/receiving terminal 90, for example, is installed on the processing chamber wall face 20 that is a lateral side of the rotary holder 5. The ultrasonic wave transmitting/receiving terminal 90 transmits ultrasonic waves toward the rotary holder 5 and receives reflected waves from the rotary holder 5. At this time, the ultrasonic wave transmitting/receiving terminal 90 detects a first time that is a time until reflective waves reflected by the level difference 91 are received after transmission of the ultrasonic waves. In addition, the ultrasonic wave transmitting/receiving terminal 90 detects a second time that is a time until reflective waves reflected by the rotation side face other than the level difference 91 are received after transmission of the ultrasonic waves. Then, ultrasonic wave transmitting/receiving terminal 90 detects an angle θ between the rotary coordinate system and the stationary coordinate system as angle data on the basis of a time difference between the first time and the second time. Here, the process of detecting angle data on the basis of the time difference may be executed by the signal processing unit 65.

Also in this embodiment, angle data can be detected without disposing a sensor in the board 50.

Embodiment 8

Next, Embodiment 8 will be described. In this embodiment, a method of detecting angle data (angle θ) on the basis of a captured image will be described.

An angle detecting unit according to this embodiment, as illustrated in FIG. 9(b), includes an angle detection area 96 formed on a rotation side face of a rotary holder 5 that is a rotating part and, as illustrated in FIG. 9(a), an imaging device 95 disposed in a non-rotating part.

The angle detection area 96 is an area of which a color or reflectivity is different from that of the other areas on the rotation side face of the rotary holder 5. For example, the angle detection area 96 is coated with a fluorescent material. In addition, angle detection areas 96 may be formed at a plurality of places as long as there is a difference in the color or the reflectivity therebetween.

The imaging device 95, for example, is installed on the processing chamber wall face 20 that is the lateral side of the rotary holder 5. The imaging device 95 generates a captured image of an area near the rotation side face of the rotary holder 5.

The imaging device 95 detects position data of the angle detection area 96 in the captured image and detects angle data on the basis of the detected position data. Here, the process of detecting angle data from the captured image may be executed by the signal processing unit 65.

Also in this embodiment, angle data can be detected without disposing a sensor in the board 50.

Embodiment 9

Next, Embodiment 9 will be described. In this embodiment, a method of detecting angle data (angle θ) by combining the processes of Embodiments 1 and 2 and the processes of Embodiments 3 to 8 will be described.

Figure 10:
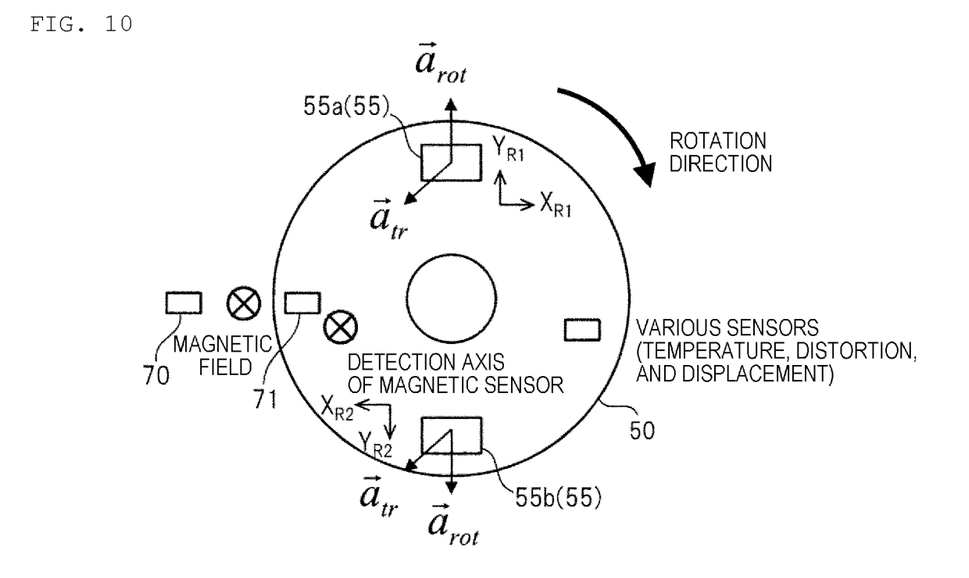
FIG. 10 is a diagram illustrating one example of main parts of a sensor system according to Embodiment 9 of the present invention.

FIG. 10 is a diagram illustrating one example of main parts of a sensor system according to Embodiment 9 of the present invention. As illustrated in FIG. 10, various sensors such as acceleration sensors 55 (for example, 55a and 55b), a magnetic sensor 71, a temperature sensor, a distortion sensor, and a displacement sensor are mounted on a board 50. A magnet 70 is installed in a non-rotating part.

In the example illustrated in FIG. 10, although a translational acceleration in a stationary coordinate system is detected by detecting acceleration data using the process of Embodiment 1 and performing coordinate system conversion using the process of Embodiment 3, the method is not limited to such a case. The process of Embodiment 1 or 2 and any one of the processes of Embodiments 3 to 8 can be arbitrarily combined.

According to this embodiment, since the processes of a plurality of embodiments are executed, the detection accuracy of the translational acceleration in the rotary coordinate system is improved, and error in acceleration data at the time of coordinate system conversion is decreased. Accordingly, even in a case in which a sensor is additionally attached, a vibration of the rotating part can be detected with a higher accuracy.

The present invention is not limited to the embodiments described above and includes various modified examples. In addition, the embodiments described above are described in detail for easy description of the present invention, and all the described components do not necessarily need to be included.

In addition, a part of components of a certain embodiment may be substituted with a component of another embodiment, and a component of another embodiment may be added to a certain embodiment. Furthermore, addition, deletion, or substitution of another component may be executed for a part of the components of each embodiment.

In addition, each member and a relative size thereof illustrated in the drawings are simplified and idealized for easy description of the present invention, and each member may have a more complicated shape for the mounting thereof.

REFERENCE SIGNS LIST

1: cut processing machine
2: rotation base part
3: protection part
5: rotary holder
7: cutting tool
50: board
55: acceleration sensor
60: power feed/communication unit
65: signal processing unit
70: magnet
71: magnetic sensor
80: light emitting unit
81: light receiving unit
82: slit plate
82a, 82b: slit part
90: ultrasonic wave transmitting/receiving terminal
91: level difference
95: imaging device
96: angle detection area
100: sensor system

The invention claimed is:

1. A sensor system comprising:
a board that is installed on a rotating part of a cut processing machine;
a plurality of acceleration sensors mounted on the board; and
an arithmetic operation unit, wherein
the arithmetic operation unit calculates a translational acceleration accompanying moving of the rotating part and a centrifugal acceleration accompanying rotation of the rotating part on the basis of acceleration measured by each of the acceleration sensors.

2. The sensor system according to claim 1, wherein the plurality of acceleration sensors include two or more acceleration sensors that are mounted on the board, and
each of the acceleration sensors has a plurality of detection axes.

3. The sensor system according to claim 2, wherein
the plurality of acceleration sensors include two acceleration sensors that are mounted on the board, and
the plurality of acceleration sensors are symmetrically arranged with a rotation axis of the rotating part interposed therebetween.

4. The sensor system according to claim 3, wherein the acceleration sensors are arranged at the same distance from the rotation axis.

5. The sensor system according to claim 1, wherein the plurality of acceleration sensors include three acceleration sensors that are mounted on the board, and each of the acceleration sensors has one detection axis.

6. The sensor system according to claim 1, wherein the rotating part includes a rotation major axis of the cut processing machine.

* * * * *